US007030901B2

(12) United States Patent
Ahn

(10) Patent No.: US 7,030,901 B2
(45) Date of Patent: Apr. 18, 2006

(54) METHODS AND APPARATUS FOR REMOVING NTSC SIGNALS FROM A DIGITAL TELEVISION SIGNAL

(75) Inventor: Jung-Hong Ahn, Kyoungki-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 626 days.

(21) Appl. No.: 10/115,690

(22) Filed: Apr. 4, 2002

(65) Prior Publication Data

US 2002/0176022 A1    Nov. 28, 2002

(30) Foreign Application Priority Data

Apr. 16, 2001    (KR) ............... 2001-20283

(51) Int. Cl.
*H04N 5/38* (2006.01)
(52) U.S. Cl. ........................ 348/21; 348/607
(58) Field of Classification Search .............. 348/21, 348/607; 5/38; H04N 5/38
See application file for complete search history.

(56) References Cited

U.S. PATENT DOCUMENTS

| 4,205,335 A | 5/1980 | Nakagawa et al. ........... 358/31 |
| 4,400,718 A | 8/1983 | Lee .............................. 358/13 |
| 4,456,922 A | 6/1984 | Balaban et al. ............... 358/31 |
| 4,464,675 A | 8/1984 | Balaban et al. ............... 358/31 |
| 4,470,069 A | 9/1984 | Lewis, Jr. et al. ............ 358/31 |
| 4,573,070 A | 2/1986 | Cooper ......................... 358/36 |
| 4,583,115 A | 4/1986 | Lynch .......................... 358/31 |
| 4,739,407 A | 4/1988 | Mack et al. ................. 358/188 |
| 5,097,321 A | 3/1992 | Stern et al. ................ 358/21 R |
| 5,173,768 A | 12/1992 | Sowig et al. ................. 358/31 |
| 5,223,920 A | 6/1993 | Srivastava ................ 358/21 R |
| 5,745,187 A * | 4/1998 | Hulyalkar et al. .......... 348/607 |
| 6,052,158 A * | 4/2000 | Nielsen ...................... 348/725 |

FOREIGN PATENT DOCUMENTS

KR    1999-75519    10/1999

* cited by examiner

*Primary Examiner*—John Miller
*Assistant Examiner*—Trang U. Tran
(74) *Attorney, Agent, or Firm*—Marshall, Gerstein & Borun LLP

(57) ABSTRACT

A method and apparatus for removing national television system committee (NTSC) signals from a broadcasted datastream including advanced television system committee (ATSC) signals are provided. The apparatus includes an NTSC signal removing unit for removing the NTSC signal from an input signal with one or a plurality of NTSC filtering units; a vestigial sideband (VSB) core unit for generating an error generating signal if the NTSC signal is not removed by the NTSC signal removing unit for a continuous time period of at least a predefined length; and an NTSC filtering selection unit for applying a control signal to select a different one of the NTSC filtering units in response to the continuous error signal output by the VSB core unit.

12 Claims, 7 Drawing Sheets

METHODS AND APPARATUS FOR REMOVING NTSC SIGNALS FROM A DIGITAL TELEVISION SIGNAL

TECHNICAL FIELD

Digital television systems and, more particularly, a method and apparatus for removing national television system committee (NTSC) signals from received digital television signals are disclosed which include advanced television system committee (ATSC) signals.

DESCRIPTION OF THE PRIOR ART

Conventional national television system committee (NTSC) signals and advanced television system committee (ATSC) signals may be used at the same time until digital broadcasting is commonly used. In this circumstance, when digital broadcasting begins and the system suffers from lack of relay stations, the NTSC signals seriously affect the restoration of the ATSC signals. Also, since digital broadcasting signals have to be received in moving situation, the above-mentioned problems are worsened.

At the digital broadcasting receiving part, an NTSC filter is used to remove the NTSC signals when the NTSC signals are received with the ATSC signals. That is, there are three methods in removing the NTSC signals, which respectively use a comb filter, a band pass filter and a combination thereof.

FIGS. 1A and 1B are diagrams illustrating a conventional comb filter structure and a characteristic graph of the comb filter. The comb filter comprises a 12-symbol delay device and an adding machine. In a comb filter of an advanced television (ATV) standard, data is supplied to a positive input of an adder and through a 12 symbol delay to a negative input of the adder. Thus, symbol #1 is subtracted from symbol #13, symbol #2 subtracted from symbol #14, etc. Namely, the 12-symbol delay device is to delay a symbol as many as 12 symbols. If the NTSC signals are removed by using the comb filter, a loss of a signal-to-noise ratio (SNR) of about 3 dB may be caused.

FIGS. 2A and 2B are diagrams showing a conventional band pass filter structure and a characteristic graph of the band pass filter. The band pass filter comprises three band pass filters such as a luminance band pass filter, a chroma band pass filter and a sound band pass filter, and an adding machine. A loss of signal-to-noise ratio of the band pass filter is differentiated according to a desired-undesired ratio (DUR).

FIG. 3 is a diagram showing the combination of the conventional comb and band pass filter. The combination is constructed according to a monograph published in IEEE, titled "Co-channel Interference Cancellation For HDTV Receivers," by Monisha Ghosh, 1999 which is hereby incorporated by reference. Signals inputted to an NTSC signal removing unit 310 flow into a multiplexer 317 through three paths. At the first path, the inputted signals directly flow into the multiplexer 317. At the second path, the inputted signals flow into the multiplexer 317 after removing the NTSC signals by the comb filter 313. At the third path, the inputted signals flow into the multiplexer 317 after removing the NTSC signal by a band pass filter 315.

The multiplexer 317 selects one of the first to the third paths in response to a control signal from an NTSC signal detecting unit 320.

FIG. 4 is a diagram showing the conventional NTSC signal detecting unit 320 shown in FIG. 3. When signals inputted into the NTSC signal detecting unit 320 are input into a band pass filter 410 passing through a luminance element, NTSC signal elements except for ATSC signal elements and luminance carrier elements may be removed. The luminance carrier elements have larger values than the two carrier elements so that it can prevent an erroneous operation generated by noise and most clearly discriminate an existence of the NTSC signal elements.

At a multiplier 430, signals passing through the band pass filter 410 after passing a 12-symbol delay device 420 and signals that are directly input to the multiplier 430 are multiplied to detect correlation of the luminance carrier elements and decrease the possibility of an erroneous operation caused by noise. Usually, a standard value of noise is assumed to be "0" so the possibility of an erroneous operation may be remarkably decreased by the multiplier 430.

Finally, if the luminance carrier elements remain among the signals that pass through the band pass filter 410, a multiplied value at the multiplier 430 is increased and it is delivered to an integrator 440, and then accumulated thereto. A comparator 460 compares values, which are accumulated for a predetermined period, with criterions 1 and 2, which are pre-calculated accumulated values.

FIGS. 5A and 5B are graphs showing a property of each NTSC removing filter and a selection usage of a conventional NTSC removing filter. The DURs, in the case of: (a) not removing the NTSC signal, (b) removing the NTSC signal by using the comb filter, and (c) removing the NTSC signal by using the band pass filter, are respectively shown in FIG. 5A. The criterion 1 is obtained at a point at which the curve for the circumstance when the NTSC signal is not removed and the curve for the circumstance when the NTSC signal is removed by using the band pass filter cross. The value in this case is an accumulated value by digital broadcasting signals of the SNR and DUR passing through the NTSC signals detecting unit for a predetermined period. The criterion 2 is obtained at a point at which the curve for the circumstance when the NTSC signals are removed by using the comb filter and the curve for the circumstance when the NTSC signals are removed by using the band pass filter cross. The value in this case is also an accumulated value of digital broadcasting signal of the SNR and DUR passing through the NTSC signal detecting unit for a predetermined period.

In the comparator 460, the compared values are divided into three areas according to the criterions 1 and 2.

Area 1: accumulated value<criterion 1
Area 2: criterion 1<accumulated value<criterion 2
Area 3: criterion 2<accumulated value Area 1 does not have the NTSC signals or has a little bit of NTSC signal so the NTSC signals may not have to be removed. In Area 2, the NTSC signals exist, so the NTSC signals have to be removed by using the band pass filter. Area 3 has a lot of NTSC signals, so the NTSC signals have to be removed by using the comb filter.

At the comparator 460, a control signal is made by comparing a criterion and an accumulated value. At the multiplexer 317, a signal, which has best efficiency, is sent to an outputting unit according to an inputted control signal.

Referring to FIG. 5B, the improved efficiency when the NTSC signals are removed by using two structures—the comb filter and the band pass filter—is shown. However, the conventional method has a problem in that a criterion should be established to efficiently remove the NTSC signal. The values compared with a predetermined criterion may be distorted by an error and the problems may generate an erroneous operation in a near place of a criterion. Also, a criterion establishment through a simulation may be largely distorted by an error in an actual channel environment modeling process.

SUMMARY OF THE DISCLOSURE

A filter selection apparatus for removing an national television system committee (NTSC) signal from a broadcast datastream is provided. The apparatus includes an NTSC signal removing unit for removing the NTSC signal from an input signal representative of the broadcast data stream. The NTSC signal removing unit includes a first filter and a second filter. The apparatus also includes a vestigial sideband (VSB) core unit for detecting at least one NTSC signal in an output of the NTSC signal removing unit, and for generating an error signal if an NTSC signal is detected. The apparatus further includes an NTSC filtering selection unit for selecting one of an equalizer, the first filter and the second filter in response to the error signal output by the VSB core unit.

A method of removing national television system committee (NTSC) signals from a broadcast datastream including an advanced television system committee (ATSC) signal is provided. The method comprises the steps of: a) processing an input signal with at least one of an equalizer, a first filter and a second filter to create a processed signal; b) generating an error signal if NTSC signals are detected in the processed signal for longer than a first predefined time period; and c) responding to the error signal by selecting a different one of the equalizer, the first filter and the second filter to process the input signal.

A method of removing national television system committee (NTSC) signals from a broadcast datastream including an advanced television system committee (ATSC) signal is provided. The method comprises the steps of: a) processing an input signal with an equalizer when initializing a vestigial sideband (VSB) core unit; b) determining if a signal output by the equalizer contains NTSC signals; c) if the signal output by the equalizer contains NTSC signals, selecting a first one of a first filter and a second filter to process the input signal into a processed signal; d) if after step c the signal output by the equalizer contains NTSC signals, selecting a second one of the first filter and the second filter to process the input signal into a processed signal; e) if the processed signal still includes NTSC signals even though each of the equalizers, the first filter and the second filter, have been sequentially tried, selecting a last one of the equalizer, the first filter and the second filter; and e) if after selecting the last one of the equalizer, the first filter and the second filter, if the signal output by the last one of the equalizer, the first filter and the second filter contains NTSC signals for a predetermined time period, resetting a frame counter.

BRIEF DESCRIPTION OF THE DRAWINGS

The following description makes reference to the accompanying drawings, in which.

DETAILED DESCRIPTION OF THE PREFERRED EMBODIMENTS

Hereinafter, an apparatus and a method for removing national television system committee (NTSC) signals using continuous error signals will be described in detail with reference to the accompanying drawings.

Figure 1B:
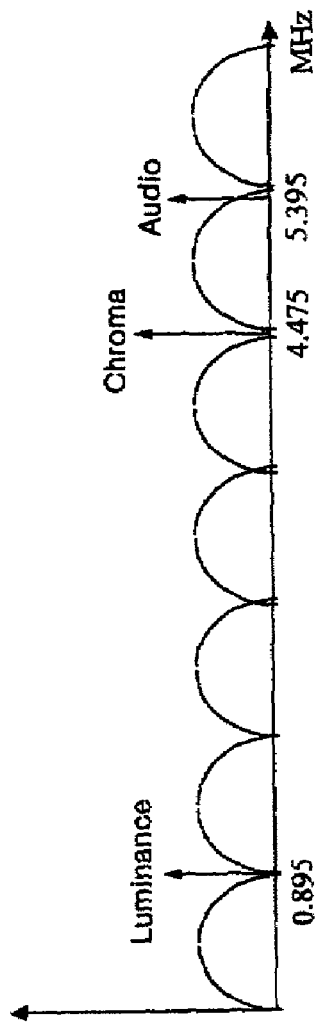
FIG. 1B is a graph showing an output from a conventional comb filter.
Figure 1A:
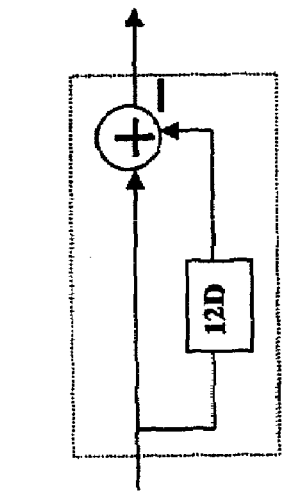
FIG. 1A is a schematic diagram illustrating a conventional comb filter.
Figure 2A:
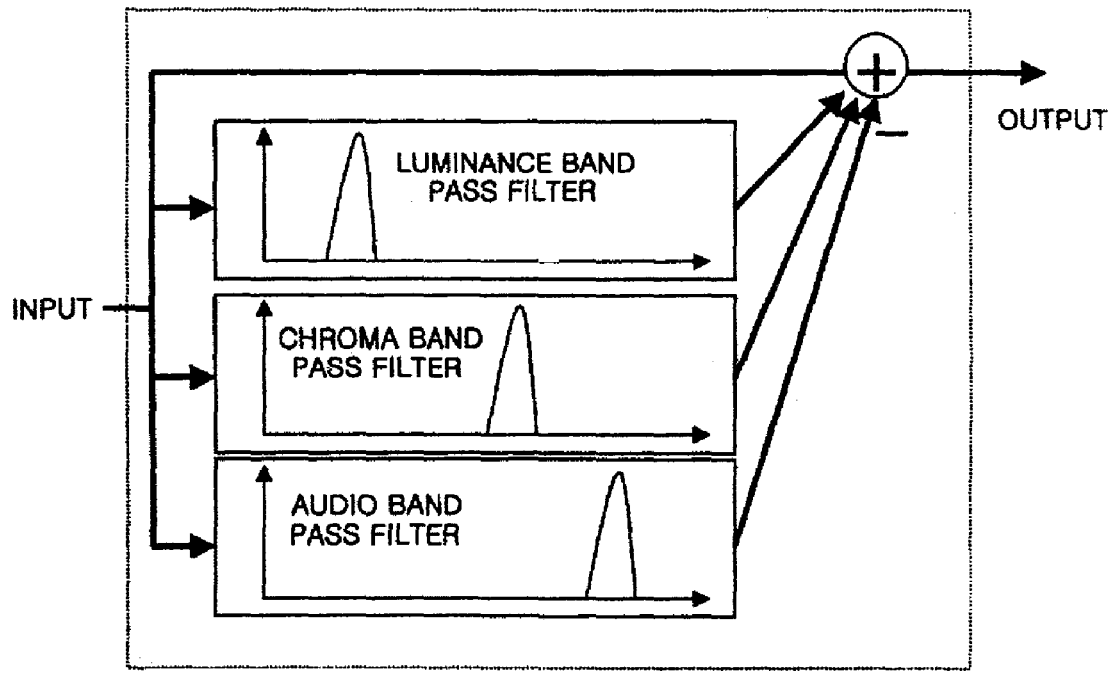
FIG. 2A is a schematic diagram showing a conventional band pass filter.
Figure 2B:
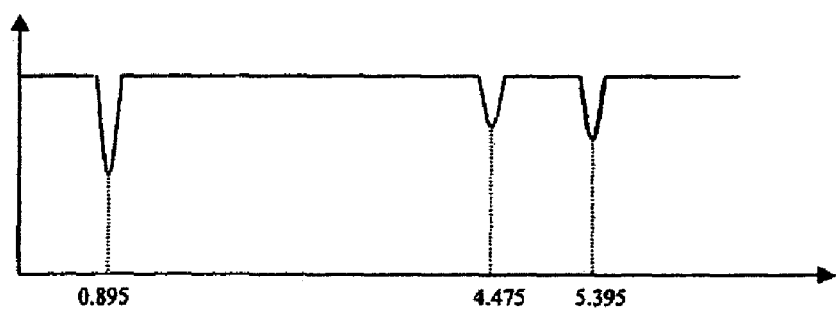
FIG. 2B is a graph showing an output from a conventional band pass filter.
Figure 3:
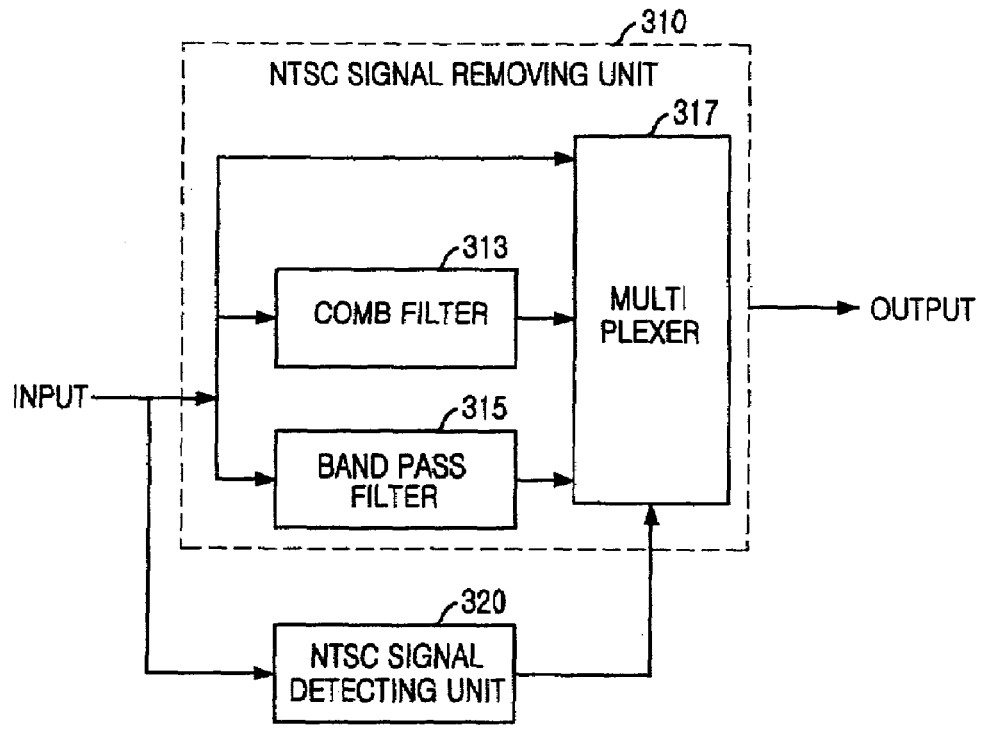
FIG. 3 is a diagram showing a conventional compound circuit of a comb filter and a band pass filter.
Figure 4:
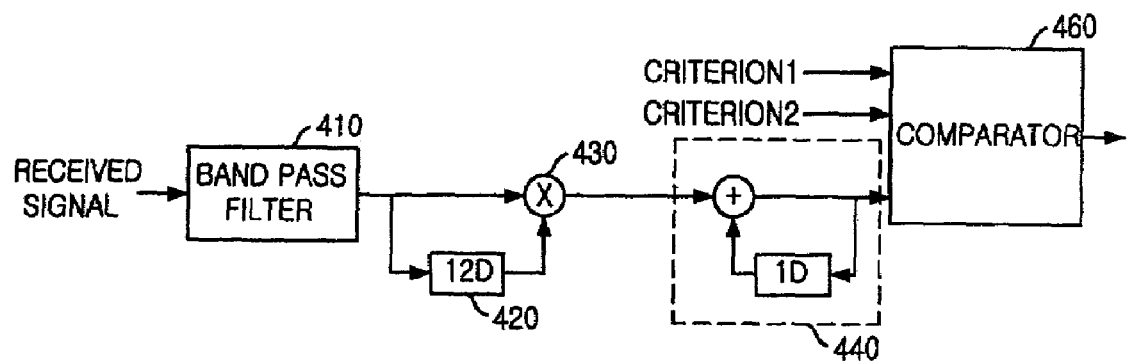
FIG. 4 is a diagram showing the NTSC signal detecting unit of FIG. 3.
Figure 5A:
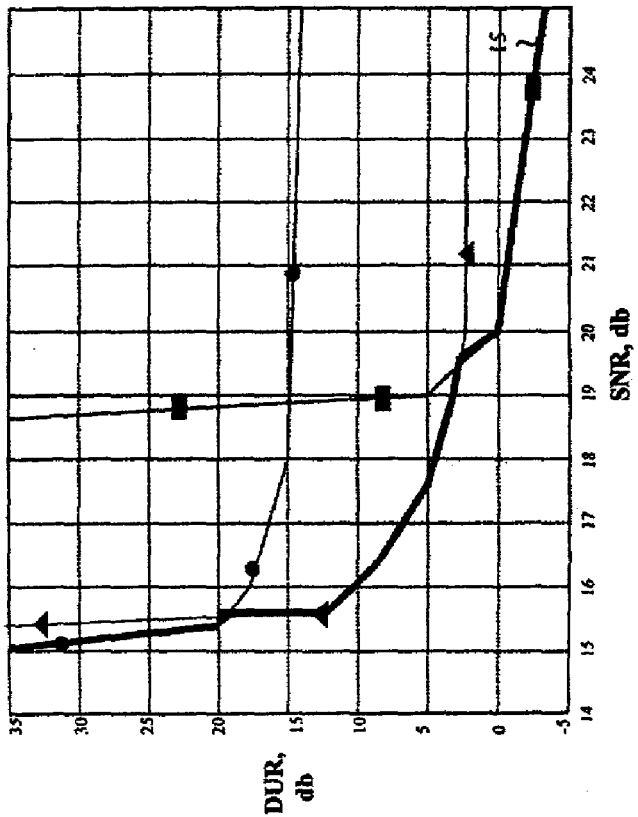
FIG. 5A is a graph showing an efficiency comparison of the outputs of NTSC removing filters.
Figure 5B:
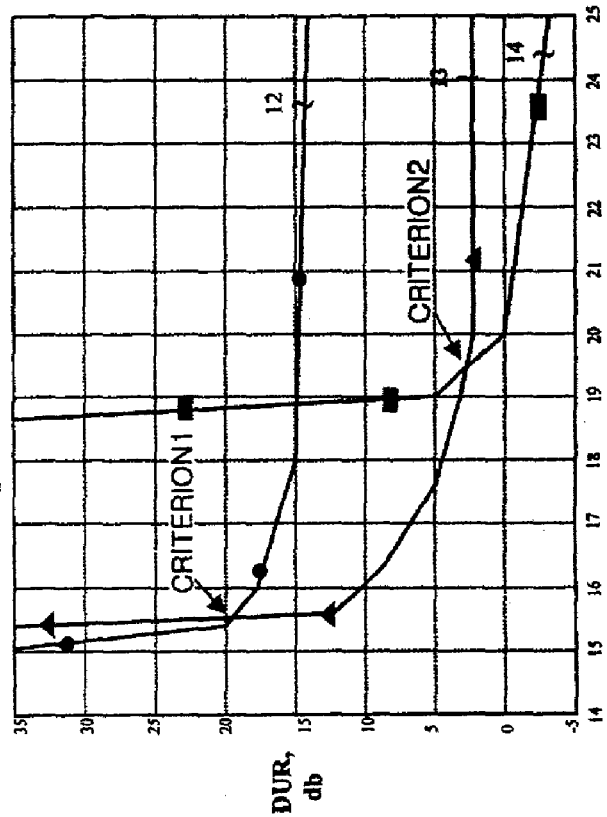
FIG. 5B is a graph showing the output achieved by a selective usage of the NTSC removing filters.
Figure 6:
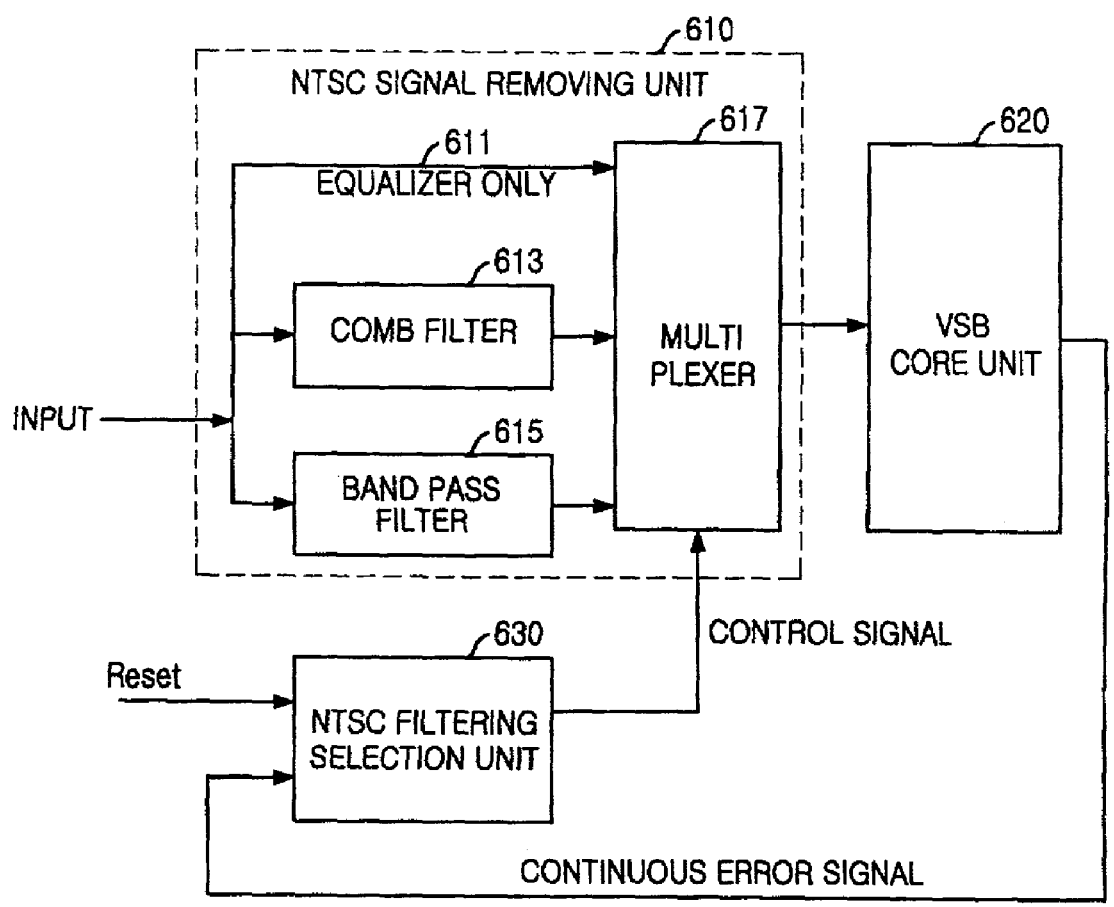
FIG. 6 is a block diagram showing an NTSC signal removing system constructed in accordance with the teachings of the present invention.

FIG. 6 is a block diagram showing an NTSC signal removing system which employs a continuous error signal. The NTSC signal removing system includes an NTSC signal removing unit 610, a vestigial sideband (VSB) core unit 620, and an NTSC filtering selection unit 630. The internal structure of the NTSC signal removing unit 610 is the same as the NTSC signal removing unit 310 shown in FIG. 3. That is, signals inputted to the NTSC signal removing unit 610 flow to a multiplexer 617 through three paths. First, the signals are inputted into the multiplexer 617, directly. Second, the inputted signal is inputted into the multiplexer 617 after removing NTSC signals by using the comb filter 613. Third, the inputted signals are inputted into the multiplexer 617 after removing NTSC signals by using the band pass filter 615. The NTSC filtering selection unit 613 determines which signal is delivered to the VSB core unit 620.

The VSB core unit 620 demodulates inputted digital signals and modifies an error included therein. At this time, since, among the signals inputted into the VSB core unit 620, a severely distorted signal cannot be modified, the VSB core unit 620 generates an error generating signal to notify this fact to its next processor (e.g., the NTSC filtering selection unit 630). After that, by using the error generating signal, an existence of an NTSC signal is determined. That is, when an error generating signal is continuously maintained over 10 frames a continuous error signal is generated by the VSB signal unit 620 and inputted into the NTSC filtering selection unit 630.

Figure 7:
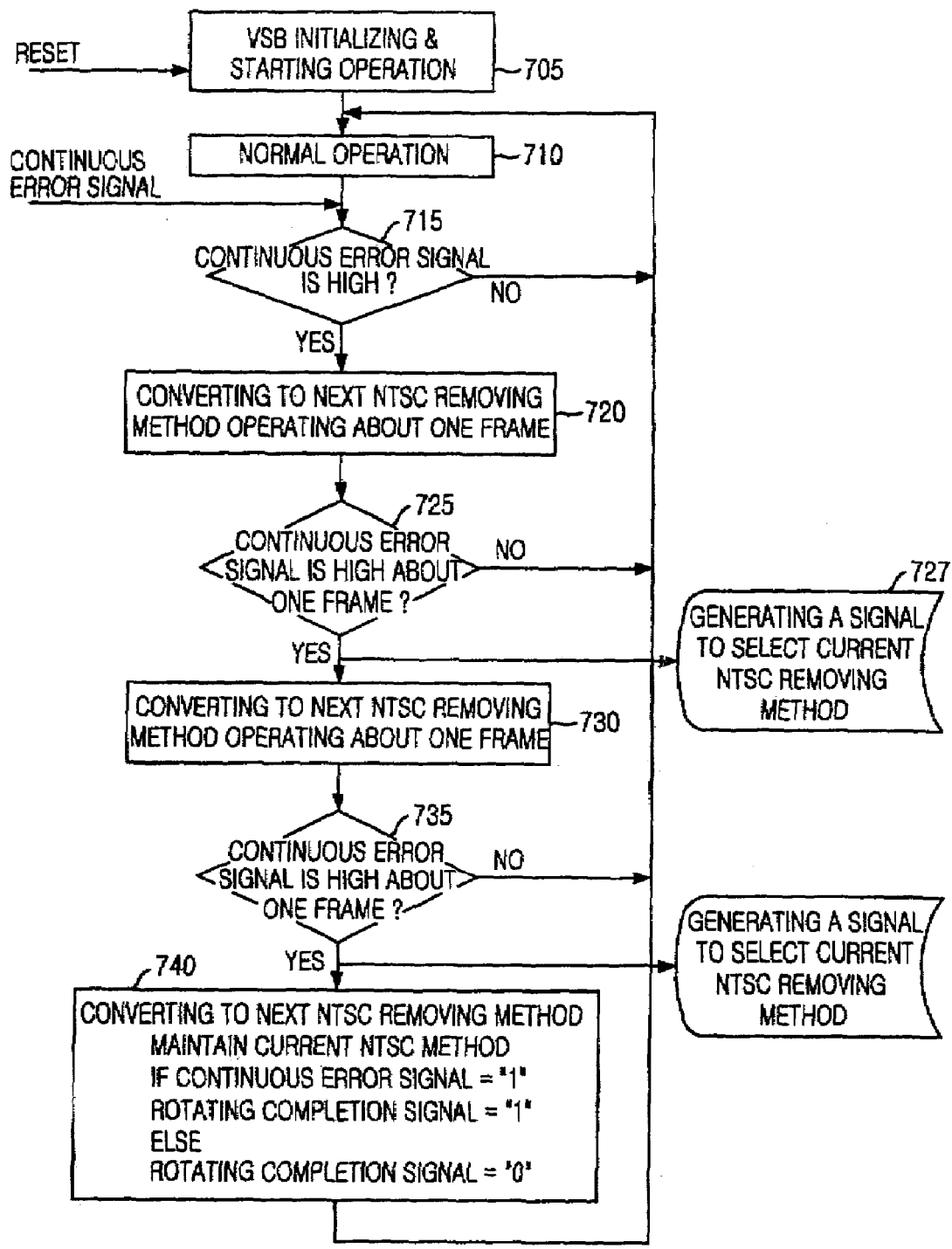
FIG. 7 is a flow chart showing an NTSC filtering selection method.

FIG. 7 is a flow chart showing an NTSC filtering selection method. The NTSC removing filter selection unit 630 determines adaptation of currently operating NTSC removing filter by using the continuous error signal and selects an NTSC removing filter according to a predetermined sequence to select the most proper NTSC removing filter.

Figure 8:
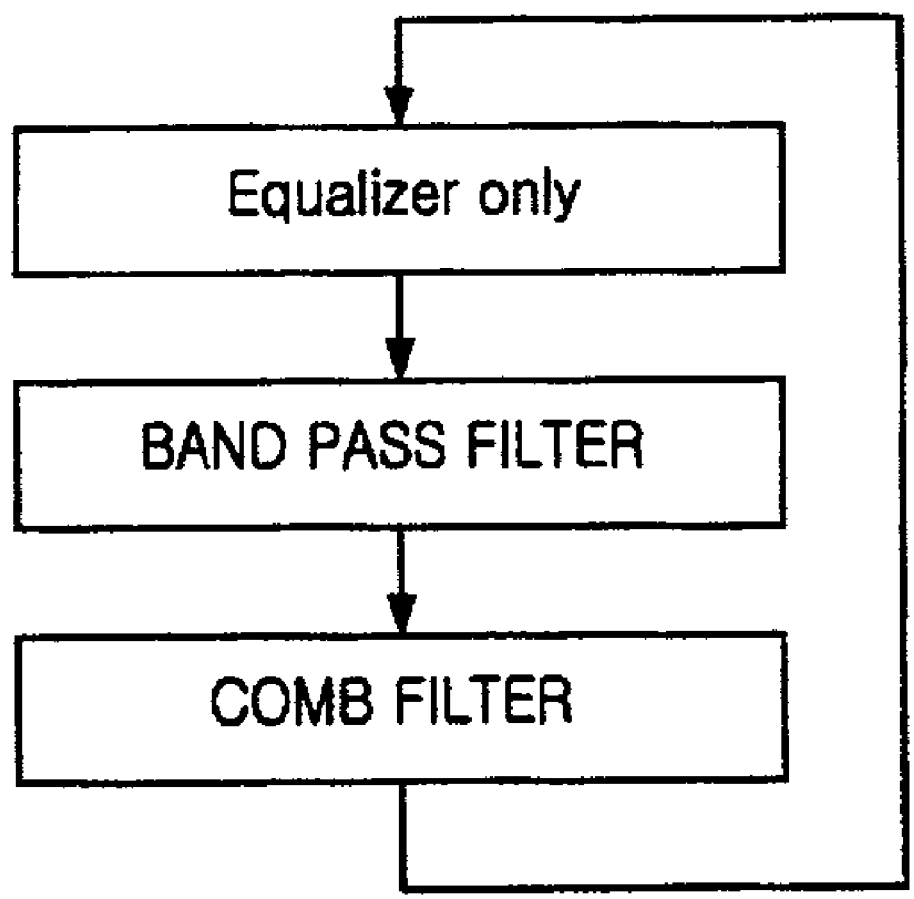
FIG. 8 is a flow chart showing a selection of an NTSC removing filter.

As shown in FIG. 8, an NTSC removing filter selection sequence is carried out in this order: equalizer only, band pass filter, and comb filter. The selection of the three is not in an ordering relation but in a unidirectional rotating relation.

In the unidirectional rotating relation, if currently the comb filter is selected and an error generating signal is converted into a logic state of a first logic value ("HIGH" condition) during a normal operation, an equalizer only, which is in a next step, is selected. At this time, if a continuous error generating signal maintains a logic state of a first logic value, a band pass filter, which is in a next step is, selected. Subsequently, if a continuous error generating signal maintains a logic state of a first logic value, then a comb filter, which is in a next step, is selected.

Returning to the flow chart of FIG. 7, when the VSB 620 is initialized at block 705, the NTSC filtering selection unit 630 selects equalizer only as a default. At block 710, normal operation proceeds until a continuous error signal is converted into a state of a first logic value (block 715). When this occurs, the NTSC filtering selection unit 630 selects the band pass filter, which is in a next step (block 720).

After selecting the band pass filter, during an operation of the first frame, the VSB core unit 620 determines an existence of an error by carrying out the normal operation and the NTSC filtering selection unit 630 watches for a continuous error signal inputted from the VSB core unit 620. If the continuous error signal is converted into a logic state of a second logic value, the NTSC signals are removed by employing the currently selected band pass filter (block 727). Then control returns to normal operation at block 710.

However, if after the first frame (block 725), the continuous error signal maintains the first logic value, the NTSC filtering selection unit 630 selects a comb filter (block 730).

After the comb filter is selected and during the first frame, if the continuous error signal maintains the first logic value at block 735, the equalizer is selected only where the continuous error signal is created and an NTSC removing filter selection process is terminated (block 740). However, if the continuous error signal is converted into the second logic value ("LOW" condition), the NTSC signals are removed by maintaining currently selected comb filter and control returns to a normal operation at block 710.

If the continuous error signal is subsequently converted into the first logic value when the current comb filter is selected, an equalizer only (which is in a next step, see FIG. 8), is selected. At this time, if the continuous error signal maintains the first logic value, a band pass filter (which is in a next step, see FIG. 8), is selected. Subsequently, if the continuous error signal maintains the first logic value, a comb filter (which is in a next step), is selected and an NTSC removing filter selection process is terminated.

As described-above, after a selection process of an NTSC removing filter is terminated and a continuous error signal maintains the first logic value, continuously (for example, if a continuous error signal maintains a logic state of a first logic value for 100 frames), after the 100 frames, a frame counting is automatically reset because the error is not an error caused by an NTSC signal inputting, but is instead an error caused by another external reason. Subsequently, a frame number where an error exists is counted and at step 715, it determines if a continuous error signal is converted into a first logic value.

Even though, any NTSC removing filter is selected and operated now, if an error which is over a predetermined frame, is generated (for example, an error is generated for 10 sequential frames), the continuous error signal is set to the first logic value. In this case, an NTSC filter of the next step is selected according to the predetermined process.

Also, one signal outputted from plural NTSC filters may be selected thereby describing one selection among plural NTSC filters, but by changing location of the multiplexer within the NTSC signal removing unit 610.

When an NTSC and an ATSC broadcasting is received at the same time, the NTSC signal may be removed efficiently. Especially, when the broadcasting signal is received in a moving automobile, an interference phenomenon of the NTSC signal from each region may be properly removed.

From the foregoing it will be appreciated that a national television system committee (NTSC) signal removing filter selection apparatus and method for delivering an input signal to a vestigial sideband (VSB) core unit without filtering an inputted signal when an NTSC does not exist has been provided. When the NTSC exists, in delivering an inputted signal to the VSB core unit after passing the comb filter or the band pass filter, digital broadcasting signal accumulated values of a signal-to-noise ratio (SNR) and a desired-undesired ratio (DUR) are compared with a criterion and the NTSC removing filter is not adapted. Subsequently, when a continuous error is generated, plural NTSC removing filters are adapted successively so that the NTSC signal received with the ATSC signal may be efficiently removed.

Although certain apparatus constructed in accordance with these teachings have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A filter selection apparatus for removing a national television system committee (NTSC) signal from a broadcast datastream, the apparatus comprising:
    an NTSC signal removing unit for removing the NTSC signal from an input signal representative of the broadcast datastream, the NTSC signal removing unit including a first filter and a second filter;
    a vestigial sideband (VSB) core unit for detecting at least one NTSC signal in an output of the NTSC signal removing unit, and for generating an error signal if an NTSC signal is detected; and
    an NTSC filtering selection unit for selecting one of an equalizer, the first filter and the second filter in response to the error signal output by the VSB core unit.

2. The apparatus of claim 1, wherein the equalizer passes the input signal without filtering; wherein the first filter is a band pass filter, and the second filter is a comb filter.

3. The apparatus of claim 2, wherein the NTSC signal removing unit includes a multiplexer for selecting one of an output of the equalizer, an output of the band pass filter, and an output of the comb filter, as the output of the NTSC signal removing unit.

4. The apparatus of claim 3, wherein when the VSB core unit is initialized, the NTSC filtering selection unit applies a control signal to the multiplexer to select the output of the equalizer.

5. The apparatus of claim 1, wherein the VSB core unit generates the error signal if the at least one NTSC signal is detected continuously over a first predetermined time frame.

6. The apparatus of claim 5, further comprising a counter for counting inputted frames, and wherein the NTSC filtering selection unit resets if the error signal output by the VSB core unit maintains a predefined state for longer than a second predetermined time frame.

7. The apparatus of claim 5, wherein the NTSC filtering selection unit is responsive to sequential error signals output by the VSB core unit to successively select the equalizer, the band pass filter and the comb filter in a uni-directional rotating relation.

8. The apparatus of claim 7, wherein when the at least one NTSC signal is removed by the one of the equalizer, the first filter, and the second filter selected by the NTSC filtering selection unit, the VSB core unit converts the error signal from a first state to a second state.

9. The apparatus of claim 1, wherein the VSB core unite develops the error signal if an NTSC signal is detected for a predetermined number of sequential frames of the broadcast datastream.

10. A method of removing national television system committee (NTSC) signals from a broadcast datastream including an advanced television system committee (ATSC) signal, the method comprising the steps of:
   a) removing the NTSC signal from an input signal representative of the broadcast datastream, the NTSC signal removing unit including a first filter and a second filter;
   b) detecting at least one NTSC signal in an output of the step a), and for generating an error signal if an NTSC signal is detected; and
   c) selecting one of an equalizer, the first filter and the second filter in response to the error signal.

11. A method of removing national television system committee (NTSC) signals from a broadcast datastream including an advanced television system committee (ATSC) signal, the method comprising the steps of:
   a) processing an input signal with an equalizer when initializing a vestigial sideband (VSB) core unit;
   b) determining if a signal output by the equalizer contains NTSC signals;
   c) if the signal output by the equalizer contains NTSC signals, selecting a first one of a first filter and a second filter to process the input signal into a processed signal;
   d) if after step c), the signal output by the equalizer contains NTSC signals, selecting a second one of the first filter and the second filter to process the input signal into a processed signal;
   e) if the processed signal still includes NTSC signals even though each of the equalizers, the first filter and the second filter, have been sequentially tried, selecting a last one of the equalizer, the first filter and the second filter; and
   f) if after selecting the least one of the equalizer, the first filter and the second filter, if the signal output by the last of the equalizer, the first filter and the second filter one contains NTSC signals for a predetermined time period, resetting a frame counter.

12. The method of the claim 11, wherein: the first filter is a band pass filter, the second filter is a comb filter, and the equalizer, the first filter and the second filter are sequentially selected in uni-directional rotating relation.

* * * * *

UNITED STATES PATENT AND TRADEMARK OFFICE
CERTIFICATE OF CORRECTION

PATENT NO. : 7,030,901 B2
APPLICATION NO. : 10/115690
DATED : April 18, 2006
INVENTOR(S) : Jung-Hong Ahn Page 1 of 1

It is certified that error appears in the above-identified patent and that said Letters Patent is hereby corrected as shown below:

<u>In the Claims:</u>

At Column 7, line 3, "unite" should be -- unit --.

At Column 8, line 15, "least" should be -- last --.

Signed and Sealed this

Ninth Day of January, 2007

JON W. DUDAS
*Director of the United States Patent and Trademark Office*